United States Patent [19]

Sakuma

[11] Patent Number: 4,627,685
[45] Date of Patent: Dec. 9, 1986

[54] POST-OBJECTIVE TYPE SCANNING DEVICE

[76] Inventor: Nobuo Sakuma, str.add-No. 1283, Higashi-naganuma, Inagi-shi, Tokyo, Japan

[21] Appl. No.: 683,880

[22] Filed: Dec. 20, 1984

[30] Foreign Application Priority Data

Dec. 22, 1983 [JP] Japan .................. 58-240861

[51] Int. Cl.$^4$ .............................. G02B 26/10
[52] U.S. Cl. .................................... 350/6.8
[58] Field of Search ............ 350/6.4, 6.5, 6.6, 6.8

[56] References Cited

U.S. PATENT DOCUMENTS 3,320,255  12/1983  Cano .................... 350/6.8
4,318,583   3/1982  Goshima et al. ........ 350/6.8

Primary Examiner—John K. Corbin
Assistant Examiner—Loha Ben
Attorney, Agent, or Firm—Guy W. Shoup

[57] ABSTRACT

A post-objective type scanning device which effects scanning after a beam has been formed into a condenser light flux by an optical deflector used for laser printers or the like includes a focusing cylindrical lens in the vicinity of the scanning surface. The cylindrical lens and scanning surface are arranged to provide a geometric optically conjugate perpendicular to the scanning line so as to correct irregularities in the scanning line and to reduce the curvature of the resulting image surface.

4 Claims, 6 Drawing Figures

POST-OBJECTIVE TYPE SCANNING DEVICE

BACKGROUND OF THE INVENTION

1. Field of the Invention

This invention relates to a photo-scanning device, and particularly to a photo-scanning device of post-objective type with a curvature of field reduced.

2. Description of the Prior Art

In optical photo-scanners used for laser printers, laser displays, etc., there are known a post-objective type in which an optical deflector is arranged after a beam has been formed into a condenser light flux by a focusing lens and a pre-objective type in which a focusing lens is arranged after the deflector. The former is subjected to focusing action prior to deflection and therefore the focusing lens is required to resolve on-axis image formation alone, thus enabling to make the lens structure simple, but the focusing point is generally formed along a curved surface. On the other hand, in the pre-objective type, the beam is incident on the focusing lens after deflection, and therefore, a focusing lens needs to be designed as a wide angle lens sufficient to cover the deflection angle, thus complicating the structure of the lens but enabling the focusing point to be formed along more of a planar image surface. At present, this type is principally used.

SUMMARY OF THE INVENTION

This invention is to provide a highly practical post-objective type scanning device by finding an optical arrangement in which the curvature of the resulting image surface of the focusing point is reduced.

FIG. 1 is a view for explaining the principle of the post-objective type scanning device to which this invention pertains. In a deflector, a spherical or cylindrical mirror M having a center C rotates about an axis O.

The scanning light flux is incident so as to be focused on a point S, and reflects at the mirror M to be image-formed at a point S'. In the figure, $S'_o$ denotes an image forming point when a deflection angle $\theta$ is zero (0).

Let $L_o$ be the length between $S'_o$ and O, and let L be the length to the foot of the perpendicular line extended down from the point S', then $$L = (\cos 2\theta / \cos \theta) k'R$$

where R is the radius of curvature of the reflecting mirror and k'R is the length from the foot of the perpendicular line which extends down from S' to the line connecting O and C. Let $k_oR$ be the length between O and S, and let kR be the length between the foot of the perpendicular line extended down from the line OC to the point S, then $k' = k_o \cos^2 \theta / \cos^2 \theta - 2k$) and after all, L is given by $$L = k_o R \cos \theta \cos 2\theta / (\cos \theta - 2k_o) \quad (1)$$

In the condition where the mirror M rotates about O, the length L is equal to the length $L_o$ when $\theta = 0$ is given by $$L = L_o = k_o R / (1 - 2k_o)$$

and at this time, the following is given, $$1/k_o = 1 + (1/\cos \theta) + (\cos \theta / (1 + \cos \theta))$$

On the other hand, $$L_o = k_o R / (1 - 2k_o)$$

then, $$1/k_o = (R/L_o) + 2$$

Therefore, $$R = \{(1/\cos \theta) + \cos \theta / (1 + \cos \theta) - 1\} L_o \quad (2)$$

Using the above relations, the invention provides an improved post-objective scanning device including a focusing cylindrical lens in the vicinity of the scanning surface in order to reduce irregularities in and the curvature of the resulting image surface.

DETAILED DESCRIPTION OF THE PREFERRED EMBODIMENTS

Figure 1:
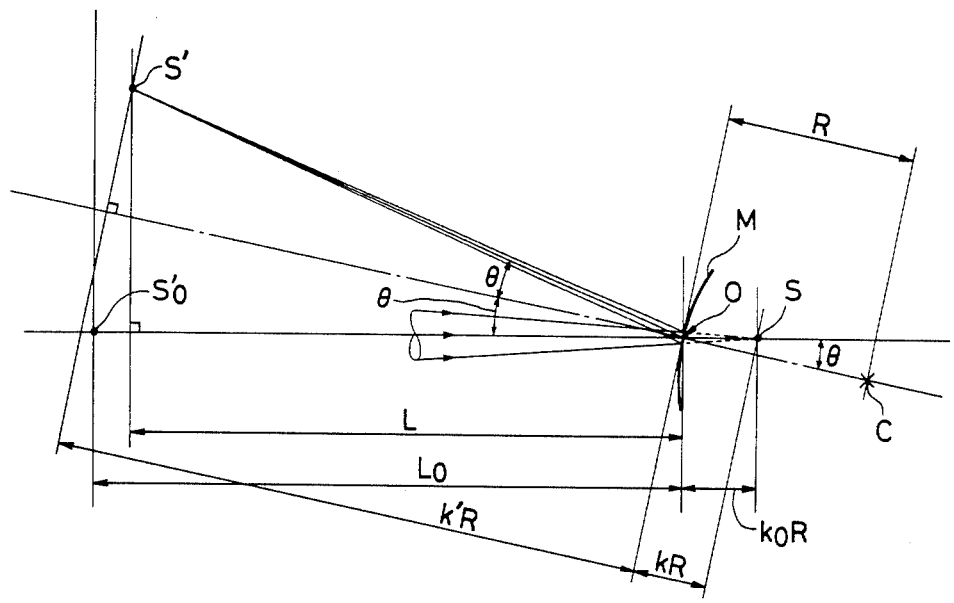
FIG. 1 is an explanatory view of the principle of of a post-objective type scanning device.
Figure 2:
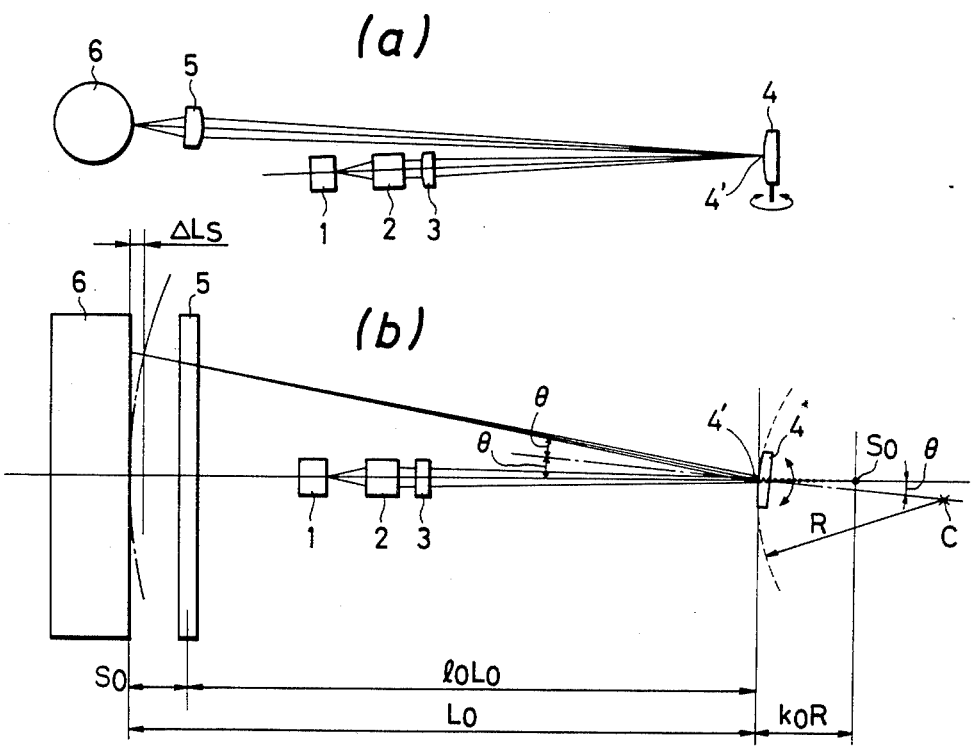
FIGS. 2(a) and (b) illustrate an optical arrangement of one embodiment of the scanning device in accordance with this invention.

FIGS. 2(a) and (b) shows a printer optical system using a semi-conductor laser as one embodiment of a scanner which satisfies the conditions of this invention.

A reference numeral 1 designates a semi-conductor laser serving as a light source, 2 a coupling lens for focusing laser light fluxes to focus them on $S_o$, 3 a first cylindrical lens having a refractive power within the surface perpendicular to the scanning line, 4 an optical reflector, 5 a second cylindrical lens having a refractive power within the aforesaid surface, and 6 a photosensitive member. Light fluxes from the laser light source 1 are condensed so as to focus on the point $S_o$ through the coupling lens 2 to be incident on the first cylindrical lens 3, and within the surface having the refractive power, the light fluxes are focused on the deflector 4. On the other hand, within the surface including a scanning line, the light fluxes are focused towards the point $S_o$ without any change. The deflecting mirror 4 rotates about the axis O to deflect the incident laser light fluxes, which are focused on the photosensitive member 6 by the second cylindrical lens 5 for scanning.

The cylindrical lens 5 is provided so that the deflecting point 4' and the scanning surface on the photosensitive member 6 are arranged to provide a geometric-optically conjugate perpendicular to the scanning line so as to correct irregularities in pitch of the scanning line and a bend of the scanning line and to reduce a bend of a sagittal image surface (an image surface in a direction along the scanning line).

The deviation $\Delta L_s$ of the sagittal image surface resulting from the curvature of the image surface, where the second cylindrical lens 5 is used, is expressed by $$\Delta L_s = \left[ \frac{1}{\{n_c/(n_c-1)l_o\}\{(\cos 2\theta'/\cos 2\theta)-1\}+1} - 1 \right] s_o \quad (3)$$

where $s_o = (1-l_o)L_o$ is the length from the second cylindrical lens to the scanning surface, and $n_c$ is the refractive index of the second cylindrical lens. From Snell's law, $$\sin 2\theta = n_c \sin 2\theta'$$

In the following, the numeric examples of the optical system in this embodiment and the prior art examples corresponding thereto are given. $\Delta LM$ indicates the deviation of the meridional image surface resulting from the curvature of the image surface.

(EXAMPLE 1)

If an angle of rotation $\theta = \pm 10°$ (deflection angle $\pm 20°$) is present, and $L_\theta = L_o = 300$ mm:

| Deflection angle | $\theta$ | $\Delta LM$ (mm) | $\Delta Ls$ (mm) |
|---|---|---|---|
| 0° | 0° | 0. | 0. |
| 4 | 2 | −0.016 | −0.135 |
| 8 | 4 | −0.056 | −0.537 |
| 12 | 6 | −0.098 | −1.197 |
| 16 | 8 | −0.100 | −2.100 |
| 20 | 10 | 0. | −3.226 |
| 24 | 12 | +0.290 | −4.549 |

From Equation (2), R = 153.480 mm
In the second cylindrical lens,
$f_c = 27$ mm
$n_c = 1.5$
Therefore, in Equation (3),
$s_o = 30$ mm
$l_o = 0.9$ mm. Compared to the above example of the invention, the prior art example corresponding thereto is as follows:

| Deflection Angle | $\Delta L_M = \Delta Ls$ mm |
|---|---|
| 0° | 0. |
| 4 | −0.731 |
| 8 | −2.920 |
| 12 | −6.556 |
| 16 | −11.621 |
| 20 | −18.092 |
| 24 | −25.936 |

$L_o = 300$ mm (EXAMPLE 2)

If an angle of rotation $\theta = \pm 5°$ (deflection angle $\pm 10°$) is present, and $L_\theta = L_o = 600$ mm:

| Deflection angle | $\theta$ | $\Delta LM$ (mm) | $\Delta Ls$ (mm) |
|---|---|---|---|
| 0° | 0° | 0. | 0. |
| 2 | 1 | −0.002 | −0.032 |
| 4 | 2 | −0.007 | −0.128 |
| 6 | 3 | −0.012 | −0.287 |
| 8 | 4 | −0.012 | −0.510 |
| 10 | 5 | 0. | −0.793 |
| 12 | 6 | +0.034 | −1.137 |

From Equation (2), R = 301.720 mm
In the second cylindrical lens,
$f_c = 28.5$ mm
$n_c = 1.5$
Therefore, in Equation (3),
$s_o = 30$ mm
$l_o = 0.95$ mm In comparison, the prior art example corresponding thereto is as follows:

| Deflection angle | $\Delta L_M = \Delta Ls$ (mm) |
|---|---|
| 0° | 0. |
| 2 | −0.366 |
| 4 | −1.462 |
| 6 | −3.287 |
| 8 | −5.839 |
| 10 | −9.115 |
| 12 | −13.111 |

$L_o = $ mm

Figure 4:
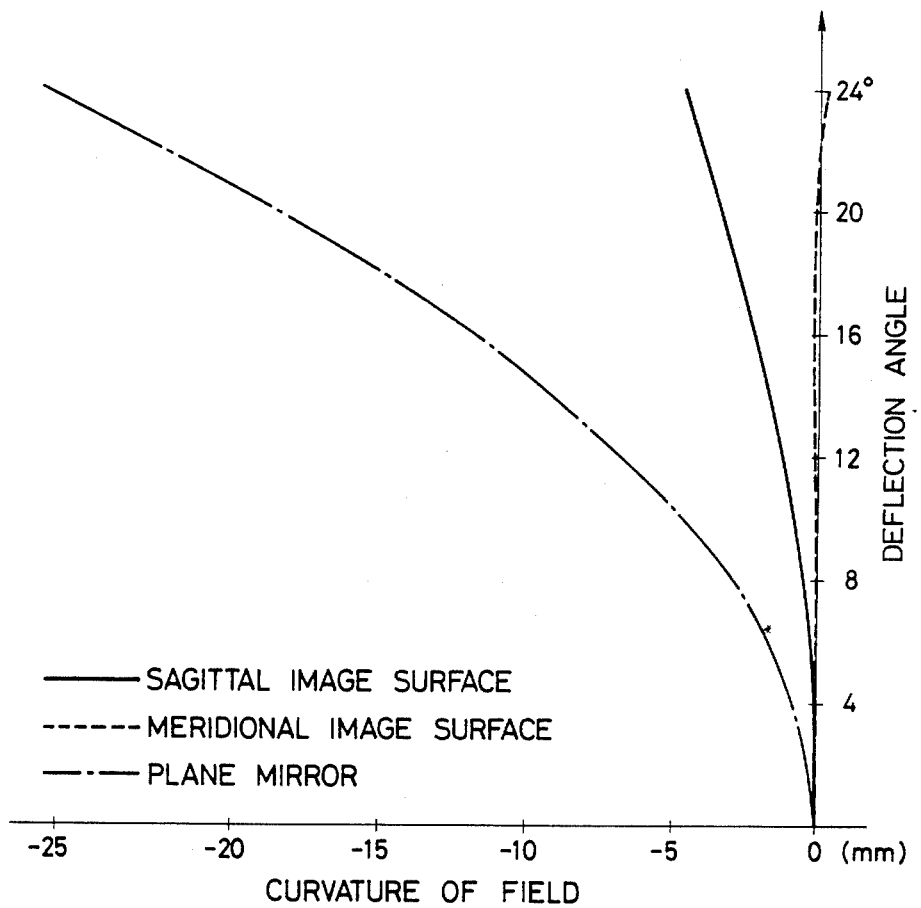
FIGS. 4 and 5 are graphic representations showing the degree of an improvement in the curvature of the resulting image surface in the scanning device in accordance with the present invention.
Figure 5:
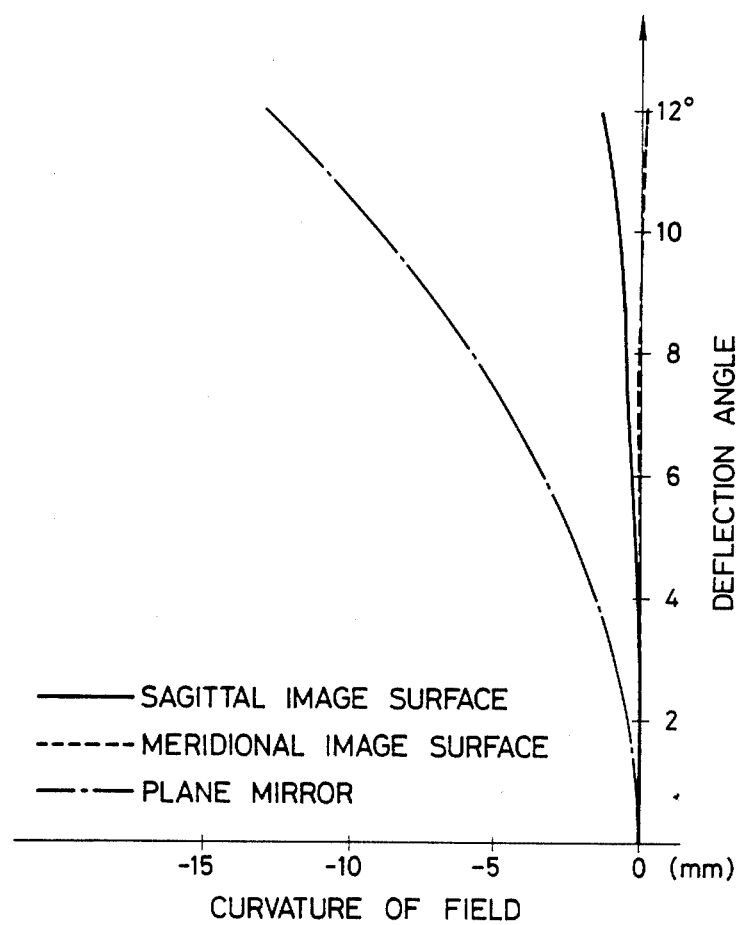

The degree of decrease in image surface curve of Example 1 is shown in FIG. 4 and Example 2 is shown in FIG. 5. The degree of decrease in displacement of the image surface is as given in the following Table.

|  | Meridional Image Surface | Sagittal Image Surface |
|---|---|---|
| Example 1 | Above 80 times | Above 5 times |
| Example 2 | Above 380 times | Above 11 times |

Figure 3:
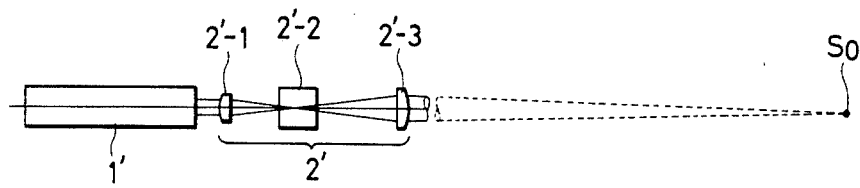
FIG. 3 is a reference view of another light source.

While in the above-described embodiment, a semiconductor laser has been used as a light source, it will be noted that a gas laser 1' and a modulation optical system 2' can be used as shown in FIG. 3. The modulation optical system 2' comprises a photo-modulation element 2'-2, a stop-down lens 2'-1 and a focusing lens 2'-3. When used for a laser display, a reflection or transmission type screen can be installed at the scanning surface position of the photosensitive member.

What is claimed is:

1. A post-objective type scanning device having reduced image surface curvature comprising a deflector whose reflection surface is a convex spherical surface having a radius R or a cylindrical mirror, a photosensitive surface in which a light beam deflected by said deflector scans and a cylindrical optical element installed in the neighbourhood of said photosensitive surface, characterized in that if the radius of said deflector is R and the relation of $L_o = L_\theta$ is present, where $L_o$ is the length from the deflecting point to the scanning surface when the rotational angle of the deflector is O and $L_\theta$ is the length from the deflecting point to the scanning surface at said rotational angle $\theta$, the following relation is established:

$$R = \{(1/\cos \theta) + \cos \theta/(1 + \cos \theta) - 1\}L_o.$$

2. A post-objective type scanning device according to claim 1 wherein the radius of curvature of a reflection surface of the deflector is R = 153.480 mm, the focal length of the cylindrical optical elements, which is a lens installed in the neighbourhood of the photosensitive surface, is fc = 27 mm, the length from the photosensitive surface to the cylindrical lens is $s_o = 30$ mm, the length from the deflecting point to the photosensitive surface is $L_o = 300$ mm, and the deflection angle in which the length $L_\theta$ to the scanning surface is equal to $L_o$ is 20°.

3. A post-objective type scanning device according to claim 1 wherein the radius of curvature of a reflection surface of the deflector is R = 301.720 mm; the focal length of the cylindrical optical element, which is a lens installed in the neighbourhood of the photosensitive surface, is fc=28.5 mm, the length from the photosensitive surface to the cylindrical lens is $s_o$=30 mm, the length from the deflecting point to the photosensitive surface is $L_o$=600 mm, and the deflection angle in which the the length $L_\theta$ to the scanning surface is equal to $L_o$ is 10°.

4. A post-objective type scanning device according to claim 1 wherein the cylindrical optical element is a focusing lens placed a length $s_o$ from the scanning surface, where $s_o=(1-l_o)L_o$, and $s_o$ is approximately 30 mm.

* * * * *